April 28, 1959

W. G. STALEY 2,884,089

AIR LINE SEPARATOR

Filed July 9, 1956

INVENTOR.
WILLIAM G. STALEY
BY
ATTORNEY

United States Patent Office 2,884,089
Patented Apr. 28, 1959

2,884,089

AIR LINE SEPARATOR

William G. Staley, Denver, Colo., assignor to Staley Research and Development Co., Denver, Colo., a corporation of Colorado Application July 9, 1956, Serial No. 596,549

3 Claims. (Cl. 183—34)

The present invention relates to a contaminates separator for gaseous fluid lines and, more particularly, to an air line separator adapted to extract oil, water, solid particles and foreign materials from the gaseous fluids passing through gas or air lines.

Among the objects of the present invention is to provide a separator unit for use in gaseous flow lines that may be connected in such lines and that is readily adapted to efficiently remove solids and liquid particles from the flow passages of such lines.

Another object of this invention is to provide a contaminates separator which utilizes a plurality of filter elements, together with changes in the direction of fluid flow, to assure complete removal of liquid and solid particles and foreign materials.

While satisfying the foregoing objects, it is a further specific object of this invention to provide a separator from which the contaminates may be easily and speedily removed from their point of collection without the necessity of interupting the flow of fluids through the line.

Figure 1:
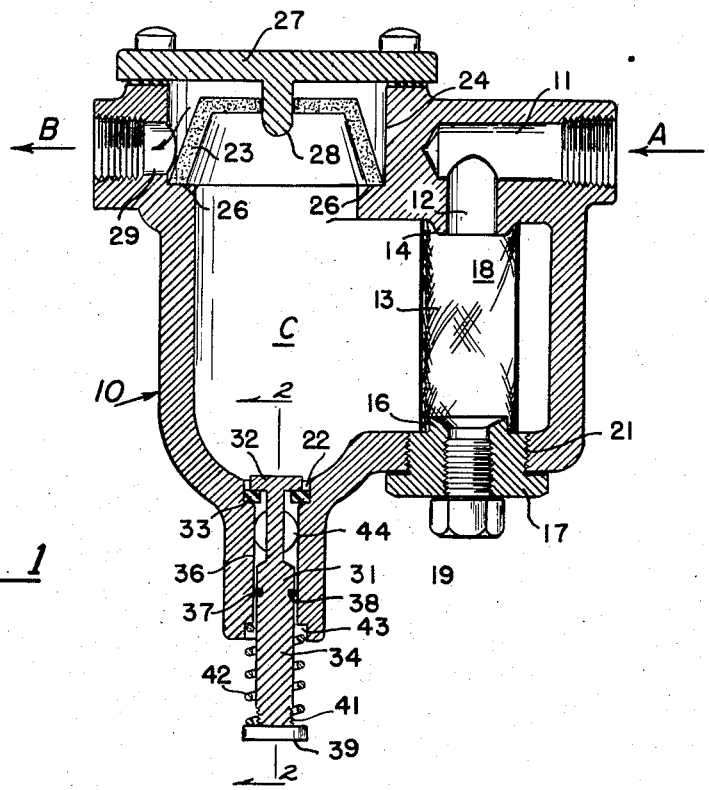
Figure 2:
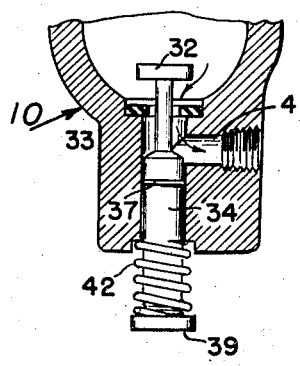

Further objects and advantages of the present invention will be apparent from the appended description and drawings, in which Fig. 1 is a cross-sectional elevation taken through the main body of a separator made in accordance with this invention, and Fig. 2 is a detail elevation in partial cross-section taken at right angles to the section of Fig. 1 and along the line 2—2 of Fig. 1 showing the discharge valve in open position.

Briefly stated, this invention provides a contaminates separator that may be connected in a fluid flow line in such manner that the incoming air or gaseous fluid passes first through an elongated cylindrical strainer before being introduced into the main chamber of the separator.

In the main chamber of the separator the direction of flow is reversed to cause the release of additional contaminates before the gaseous flow is passed through a second filter element which completes the removal of contaminates. Clean-out devices are provided interiorly of the cylindrical strainer and at the bottom of the main chamber, so that the collected contaminates may be readily removed. The contaminates discharge valve in the main chamber is of special structure such that when the valve plunger is moved reciprocally, collected materials in the chamber will be discharged.

The detailed features of the present invention may be more clearly understood after reference to the accompanying drawings, in which Fig. 1 shows the general arrangement of a separator made in accordance with this invention. The separator 10 is designed so that the inlet port A and outlet port B may be connected in a conventional gaseous fluid flow line, so that the flow through the line will be directed through the separator. If connected in an air line, the air will be introduced at port A to course through drilled openings 11 and 12. Passing downwardly through opening 12, the air will flow into the center of an elongated cylindrical strainer 13, which is disposed between an annular boss 14 and a shoulder 16 of clean-out screen plug 17. As the air passes through the fine mesh screen 18 of cylindrical strainer 13, the relatively coarser particles will be retained within the strainer 13 and will fall to the bottom of the strainer to accumulate over the surface of the screen plug 17. The accumulated particles may be removed from their point of accumulation by removing the blow-down plug 19, which is threadedly received in the screen plug 17, or, if desirable, the screen plug 17 may be removed, so that the entire screen assembly may be taken out of the separator for cleaning through the threaded opening 21.

When in assembled relation, the air passing through the screen 18 will next be introduced into the main separator chamber C. Because of the large capacity of this type design separator, a considerable flow of air will be introduced into the main chamber C. This large capacity air flow, together with the design of the chamber C will tend to create a minor vortex flow characteristic within the chamber which, when coupled with the inherent change of direction for the fluid flow, will cause a density separation of the flow which will contribute to the removal of additional particles and the further removal of liquid trapped in the stream flow. All such density-separated particles and liquid will tend to fall to the base of the chamber C to a position adjacent a valve seat opening 22.

Further, after the change in flow direction, the air will be directed upwardly into contact with a filter element 23, which preferably is of porous material having considerably smaller openings than the openings through the screen wire 18 of the cylindrical strainer 13. Certain powdered type metal filters would very satisfactorily meet the requirements for the filter element 23. Since filter element 23 is positioned within a cylindrical filter receptacle 24 and is held in a position of contact with the cylindrical filter receptacle 24 and shoulder 26 cut in the separator body by means of a separator cap 27 having a downwardly extending nipple 28, all the air flow directed upwardly from the chamber C will have to pass through the filter element 23 before it is removed from the separator through the chamber 29 and outlet port B. On passage through the filter element 23 the remaining contaminates in the air stream will be removed, and the stream flow away from the separator will be clean and free of contaminates which might damage operative units connected to the air line. All the contaminates removed by the filter element 23 will likewise tend to fall to the bottom of chamber C.

In order to remove the contaminates collected at the bottom of chamber C, a special type plunger valve is provided for use in chamber C. This plunger valve 31 is of design such that the valve face 32 may be moved toward and away from the valve seat gasket 33 by reciprocal movement of a plunger 34 attached to the valve face 32. As shown, the plunger 34 portion of the valve 31 fits closely within a valve chamber 36, and an O ring type seal 37 is positioned in an annular groove 38 cut in the face of the plunger 34 and adapted for engagement with the walls of the valve chamber 36. The mechanical structure of the plunger discharge valve 31 is completed by a push button 39 engaged with the threads 41 at the end of the plunger 34 which holds a spring 42 in compression between the push button 39 and a shoulder 43 cut in the separator body. When assembled, as shown in Fig. 1, the force exerted by the spring 42 against the push button 39 will tend to hold the valve 31 in a closed position with valve face 32 against the valve seat 33.

After the separator has been in operation for a predetermined time and after the contaminates removed from the air stream have been collected at the base of chamber C and adjacent to the valve seat opening 22, all such accumulated contaminates may be removed from the chamber C by pushing on the push button 39 to move the valve 31 to an alternate open position, as shown in Fig. 2. When in this open position, the contaminates will be allowed to move downwardly past the valve seat 33 and out the discharge opening 44. When the system is under pressure, the discharge of contaminates through the plunger valve will be effected quickly and little or no interruption of the air system operation will be noted.

Accordingly, it will be observed that this invention provides a separator which, in satisfying the main objects set forth, presents a useful improvement in gaseous fluid flow apparatus. Further, while a separate embodiment of this invention has been shown and described, it will be apparent that the invention is adaptable to various modifications and changes. All such modifications and changes as come within the scope of the hereunto appended claims are deemed to be a part of this invention.

What is claimed is:

1. A contaminates separator for operation at super-atmospheric pressures in gaseous fluid flow lines comprising a body member enclosing a main chamber and providing inlet and outlet openings adapted to be connected in a flow system, a cylindrical strainer for the removal of larger solids particles positioned within said body having its interior surface in flow communication with said inlet and its exterior surface within said main chamber, a removable clean-out plug of size corresponding to the interior dimension of said strainer extending through said body and aligning with the interior of said strainer to facilitate removal of accumulated particles from the interior of said strainer, said particles being carried out of said strainer by escaping gaseous fluid when the plug is removed a filter element having minute flow passages therethrough of size smaller than the passages through said strainer located within said main chamber in flow position intermediate said main chamber and outlet, said filter element being adapted for the removal of liquids and smaller solids particles materials, and said main chamber having a low point for the gravitational collection of said materials, said body further providing a valve seat adjacent said low point and an elongated bore concentric with said valve seat and communicating with the exterior of said separator, a plunger for reciprocal movement in said bore, a valve element on said plunger for mating engagement with said valve seat, a spring member for normally holding said valve element against said valve seat in closed position, and means for reciprocally moving said plunger and valve element away from the closed position when it is desired to discharge accumulated materials from the main chamber of said separator.

2. A contaminates separator for operation at super-atmospheric pressures in gaseous fluid flow lines comprising a body member enclosing a main chamber and providing inlet and outlet openings adapted to be connected in a flow system, a cylindrical strainer for the removal of larger solids particles positioned within said body having its interior surface in flow communication with said inlet and its exterior surface within said main chamber, a removable clean-out plug extending through said body and aligning with the interior of said strainer to facilitate removal of accumulated particles from the interior of said strainer, said particles being carried out of said strainer by escaping gaseous fluid when the plug is removed a filter element having minute flow passages therethrough of size smaller than the passages through said strainer located within said main chamber in flow position intermediate said main chamber and outlet, said filter element being adapted for the removal of liquids and smaller solids particles materials, and said main chamber having a low point for the gravitational collection of said materials, said body further providing a valve seat adjacent said low point and an elongated bore concentric with said valve seat and communicating with the exterior of said separator, a plunger of size corresponding to the size of said bore to effect a seal between said plunger and bore for reciprocal movement in said bore, a valve element on said plunger for mating engagement with said valve seat, a spring member for normally holding said valve element against said valve seat in closed position when the interior of said separator is at super-atmospheric or atmospheric pressure, and means for reciprocally moving said plunger and valve element away from the closed position when it is desired to discharge accumulated materials from the main chamber of said separator.

3. A contaminates separator for operation at super-atmospheric pressures in gaseous fluid flow lines comprising a body member enclosing a main chamber and providing inlet and outlet openings adapted to be connected in a flow system, a cylindrical strainer for the removal of larger solids particles positioned within said body having its interior surface in flow communication with said inlet and its exterior surface within said main chamber, a removable clean-out plug extending through said body and aligning with the interior of said strainer to facilitate removal of accumulated particles from the interior of said strainer, said particles being carried out of said strainer by escaping gaseous fluid when the plug is removed a filter element having minute flow passages therethrough of size smaller than the passages through said strainer located within said main chamber in flow position intermediate said main chamber and outlet, said filter element being adapted for the removal of liquids and smaller solids particles materials, and said main chamber having a low point for the gravitational collection of said materials, said body further providing a valve seat adjacent said low point and an elongated bore concentric with said valve seat and communicating with the exterior of said separator, a plunger for reciprocal movement in said bore, a valve element on said plunger for mating engagement with said valve seat, a spring member biased for normally holding said valve element against said valve seat in closed position when the interior of said separator is at super-atmospheric or atmospheric pressure with said gaseous fluids when under super-atmospheric pressure being held within said separator by said valve element and said valve seat, and means for reciprocally moving said plunger and valve element away from a closed position when it is desired to discharge accumulated materials from the main chamber of said separator, said discharge being accelerated and facilitated by the escape of a portion of said gaseous fluid as a carrier medium for said accumulated materials.

References Cited in the file of this patent

UNITED STATES PATENTS

| | | |
|---|---|---|
| 569,203 | Hunt | Oct. 13, 1896 |
| 581,912 | Hunt | May 4, 1897 |
| 983,352 | Cox | Feb. 7, 1911 |
| 1,085,159 | Raab | Jan. 27, 1914 |
| 1,444,384 | Patitz | Feb. 6, 1923 |
| 1,566,084 | Gardner et al. | Dec. 15, 1925 |
| 1,785,331 | Spencer | Dec. 16, 1930 |
| 2,508,015 | Dexter | May 16, 1950 |
| 2,692,655 | Peeps | Oct. 26, 1954 |